US012675204B2

(12) United States Patent
Chen

(10) Patent No.: US 12,675,204 B2
(45) Date of Patent: Jul. 7, 2026

(54) DYNAMICALLY RENDERED INTERACTION GRAPHIC

(71) Applicant: Visa International Service Association, San Francisco, CA (US)

(72) Inventor: Yuexi Chen, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 83 days.

(21) Appl. No.: 18/593,445

(22) Filed: Mar. 1, 2024

(65) Prior Publication Data

US 2024/0295946 A1     Sep. 5, 2024

Related U.S. Application Data

(60) Provisional application No. 63/487,854, filed on Mar. 1, 2023.

(51) Int. Cl.
*G06F 3/048*          (2013.01)
*G06F 3/04817*       (2022.01)
*G06K 7/10*          (2006.01)

(52) U.S. Cl.
CPC ..... *G06F 3/04817* (2013.01); *G06K 7/10297* (2013.01)

(58) Field of Classification Search
None
See application file for complete search history.

(56) References Cited

U.S. PATENT DOCUMENTS

| | | | |
|---|---|---|---|
| 9,065,535 B2 * | 6/2015 | Wong | H04B 1/3827 |
| 11,005,180 B2 | 5/2021 | Mu et al. | |
| 2013/0219263 A1 * | 8/2013 | Abrahami | G06F 16/9577 |
| | | | 715/234 |
| 2017/0109553 A1 * | 4/2017 | Berge | G06K 7/10099 |
| 2020/0334429 A1 * | 10/2020 | Singal | G06Q 10/10 |
| 2023/0065694 A1 * | 3/2023 | Wobak | G06Q 20/3278 |
| 2023/0237287 A1 * | 7/2023 | Young | G06Q 20/3278 |
| | | | 235/380 |

FOREIGN PATENT DOCUMENTS

| | | |
|---|---|---|
| CN | 107682056 A | 2/2018 |
| CN | 218568310 U | 3/2023 |
| EP | 2 620 845 B1 | 8/2018 |
| WO | 2005069869 A2 | 8/2005 |
| WO | 2021143650 A1 | 7/2021 |

* cited by examiner

*Primary Examiner* — Thanh T Vu

(74) *Attorney, Agent, or Firm* — Kilpatrick Townsend & Stockton LLP

(57)          ABSTRACT

A method includes rendering, by a display of a communication device, a user interface to a user after the user interacts with the communication device. A processor associated with the communication device determines a location of a contactless reader device in the display of the communication device. Responsive to determining the location, the method includes rendering an interaction graphic associated with the contactless reader device on the display proximate to the location.

20 Claims, 9 Drawing Sheets

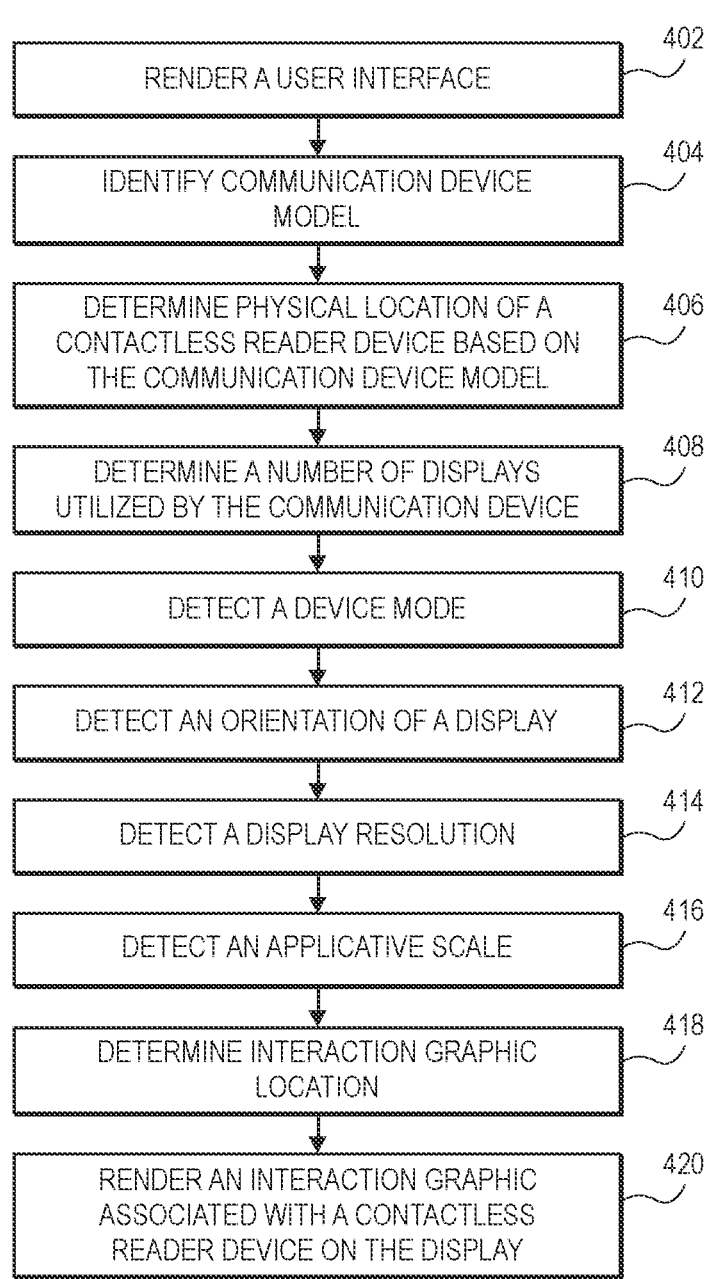

RENDER A USER INTERFACE — 402

IDENTIFY COMMUNICATION DEVICE MODEL — 404

DETERMINE PHYSICAL LOCATION OF A CONTACTLESS READER DEVICE BASED ON THE COMMUNICATION DEVICE MODEL — 406

DETERMINE A NUMBER OF DISPLAYS UTILIZED BY THE COMMUNICATION DEVICE — 408

DETECT A DEVICE MODE — 410

DETECT AN ORIENTATION OF A DISPLAY — 412

DETECT A DISPLAY RESOLUTION — 414

DETECT AN APPLICATIVE SCALE — 416

DETERMINE INTERACTION GRAPHIC LOCATION — 418

RENDER AN INTERACTION GRAPHIC ASSOCIATED WITH A CONTACTLESS READER DEVICE ON THE DISPLAY — 420

FIG. 4

DYNAMICALLY RENDERED INTERACTION GRAPHIC

CROSS-REFERENCES TO RELATED APPLICATIONS

This application claims the benefit of U.S. Provisional Application No. 63/487,854, filed Mar. 1, 2023, which is herein incorporated by reference in its entirety for all purposes.

BACKGROUND

In some cases, a user may wish to interact a user device, such as a card or fob, with a communication device, such as a laptop computer. The user device can serve as an authentication token (i.e., something that an authentic user has) when the user is attempting to access a resource via the communication device. The resource can be secure data from a remote server, access to an online system, or a good or a service as a result of a payment transaction. In this type of interaction, a user interface in the communication device can show a user where to interact (e.g., "tap") their user device. The communication device can include an NFC (near filed communications) reader with an NFC antenna. The user device can have another NFC antenna. The user can interact the user device where they are instructed to do so, and data (e.g., a credential) from the user device can pass to the communication device via the NFC antennas. The user device can communicate the data to a remote server, which can verify the data and provide access to a resource.

However, communication devices with NFC readers come in different form factors. The location of an NFC antenna in a communication device varies for the different form factors. Further, some communication devices support multiple device configurations and/or orientations (e.g., 2-in-1 or 3-in-1 laptops, tablet modes, tent modes, multiple screens, etc.). Given the various types of communication devices and the myriad of orientations and configurations that they can have, rendering an interaction graphic (e.g., a "tap here" graphic) for the user in a single static location on a user interface on a communication device is impractical. The user can become confused if the interaction graphic is not located in the correct location and does not guide the user as to where they should interact their user device.

Embodiments of the disclosure address this problem and other problems individually and collectively.

SUMMARY

Embodiments are related to methods and systems for dynamically rendering interaction graphics.

One embodiment is related to a method comprising: rendering, by a display of a communication device, a user interface to a user after the user interacts with the communication device; determining, by a processor associated with the communication device, a location of a contactless reader device in the display of the communication device; and responsive to determining the location, rendering an interaction graphic associated with the contactless reader device on the display proximate to the location.

Another embodiment is related to a communication device comprising: a processor; and a computer-readable medium coupled to the processor, the computer-readable medium comprising code executable by the processor for implementing a method comprising: rendering, in a display, a user interface to a user after the user interacts with the communication device; determining a location of a contactless reader device in the display of the communication device; and responsive to determining the location, rendering an interaction graphic associated with the contactless reader device on the display proximate to the location.

Another embodiment is related to a system comprising: a processor; and a computer-readable medium coupled to a processor, the computer-readable medium comprising code executable by the processor for implementing a method comprising: rendering, in a display, a user interface to a user after the user interacts with a communication device; determining a location of a contactless reader device in the display of the communication device; and responsive to determining the location, rendering an interaction graphic associated with the contactless reader device on the display proximate to the location.

Further details regarding embodiments of the disclosure can be found in the Detailed Description and the Figures.

BRIEF DESCRIPTION OF THE DRAWINGS

FIG. 4 shows a flow diagram illustrating methods according to embodiments.

DETAILED DESCRIPTION

Figure 1:
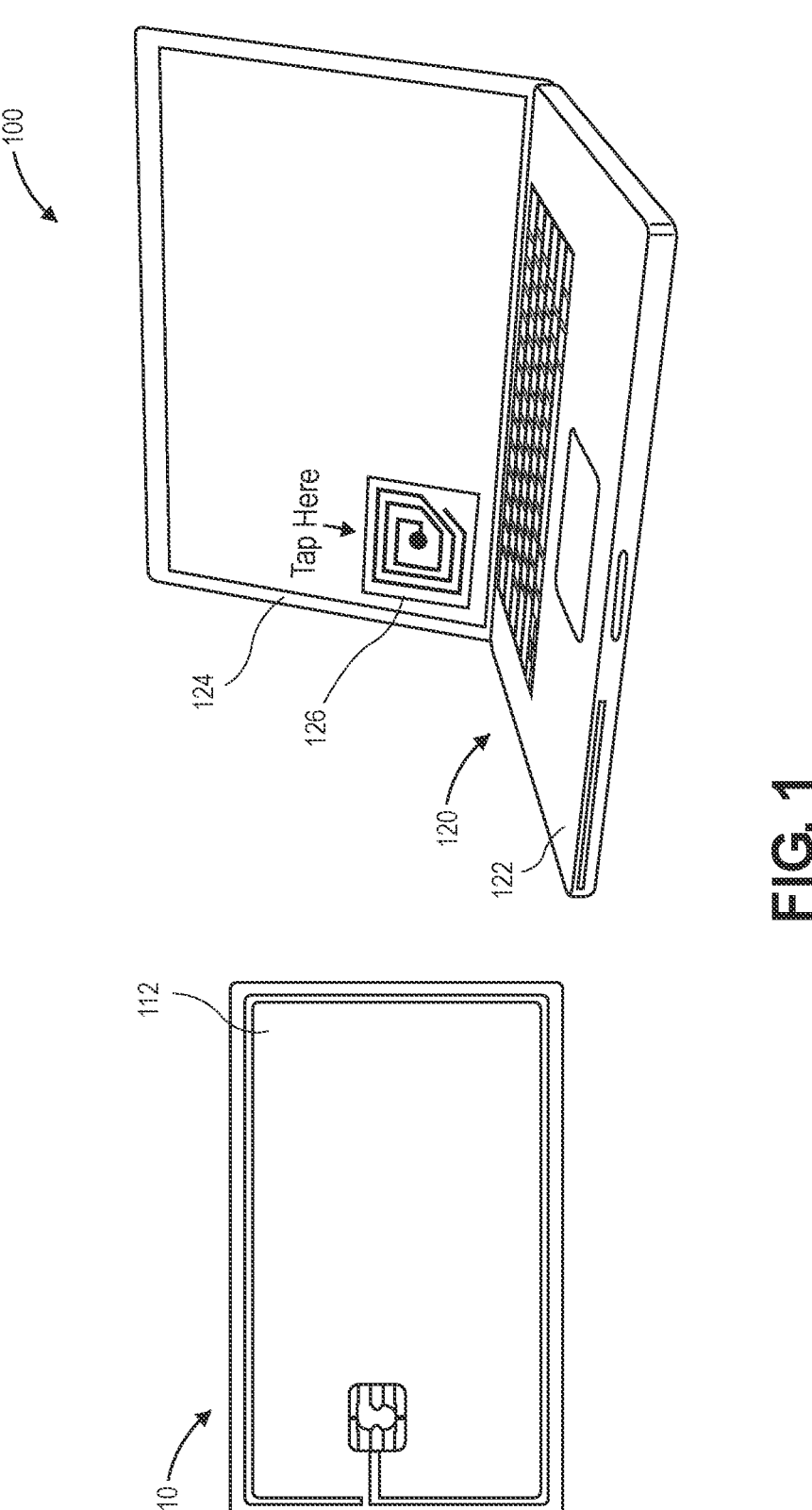
FIG. 1 shows a block diagram of a system according to embodiments.

Prior to discussing embodiments of the disclosure, some terms can be described in further detail.

A "user" may include an individual. In some embodiments, a user may be associated with one or more accounts and/or user devices.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. In some embodiments, a user device can be a payment device.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile communication devices include mobile phones (e.g., cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit credentials for an interaction).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Credentials may include any suitable information associated with an account (e.g., a payment account and/or payment device associated with the account). Such information may be directly related to the account or may be derived from information related to the account. Examples of account information may include a primary account number (PAN), username, expiration date, and verification values.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

"Interaction data" can include data related to and/or recorded during an interaction. In some embodiments, interaction data can be transaction data of the network data. Transaction data can comprise a plurality of data elements with data values.

A "contactless reader device" can include a component that can obtain information from another device in a contactless manner. A contactless reader device can read information from a user device over-the-air. A contactless reader device can include an antenna. A contactless reader device can be a near-field communication antenna. A contactless reader device can obtain interaction data from a user device during an interaction.

An "antenna" can include a device used to transmit and/or receive signals. An antenna can be a rod, a wire, a chip, a chipset, etc. that is capable of receiving and/or transmitting radio signals. An antenna can be a near-field communication antenna, an ultra-wideband antenna, or any other suitable type of antenna.

A "near-field communication antenna" can include a device used to transmit and/or receive near-field communication based signals. A near-field communication antenna can be a chip or a chipset that enables short-range wireless communication between two devices. A near-field communication antenna can be a near-field communication reader chip (e.g., active component) or a near-field communication tag (e.g., passive component). A near-field communication antenna that is a near-field communication reader chip can provide power and can send near-field communication commands to a near-field communication tag. Near-field communication is based on inductive coupling between two antennas present on two devices (e.g., on a user device and on an access device). The two devices can communicate in one or both directions, using a frequency of 13.56 MHz in the globally available unlicensed radio frequency ISM band using the ISO/IEC 14443 air interface standard at data rates ranging from 106 to 848 kbit/s.

A "user interface" can include means by which a user and a computer system interact. A user interface can include a graphical user interface. A user interface can include graphical icons and visual indicators. A user interface can include an interaction graphic.

An "interaction graphic" can include a rendered visual graphic icon that indicates information to a user. An interaction graphic can be rendered in a user interface on a display screen. An interaction graphic can indicate a location of the display screen that is proximate to a physical location of a contactless reader device in a communication device. An interaction graphic can indicate to a user a location at which the user is to position their user device such that the user device can communicate with the communication device via the contactless reader device.

A "device mode" can include an option allowing a change in the method of operation of a device. A device mode can be a physical mode of a device. For example, a device mode can be triggered by, and be indicative of, a device being manipulated into a particular physical arrangement. As an illustrative example, a laptop computer may have a plurality of device modes. The laptop may be configured to have a laptop mode, a stand mode, a tent mode, a tablet mode, etc. that indicate how the laptop's screen is physically arranged compared to the laptop's keyboard.

A "resource provider" may be an entity that can provide a resource such as goods, services, information, and/or access. Examples of resource providers includes access providers, merchants, data providers, transit agencies, governmental entities, venue and dwelling operators, etc.

An "acquirer" may typically be an entity (e.g., a commercial bank) that has a relationship with a particular resource provider or other entity. Some entities can perform both issuer and acquirer functions. Some embodiments may encompass such single entity issuer-acquirers. An acquirer may operate a transport computer.

An "authorizing entity" may be an entity that authorizes a request. Examples of an authorizing entity may be an issuer, a governmental agency, a document repository, an access administrator, etc.

An "issuer" can include an entity (e.g., a credential issuer, a transit authority, a bank, etc.) that maintains an account for a user. An issuer may also issue credentials stored on a user device.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a username, an expiration date, etc. An authorization request message may also comprise "transaction information," such as any information associated with a current transaction, such as the transaction amount, resource provider identifier, resource provider location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, resource provider must call the toll-free authorization phone number. The authorization response message may also include an authorization code, which may be a code that a credit card issuing bank returns in response to an authorization request message in an electronic message (either directly or through the transaction processing computer) to the resource provider's access device (e.g., POS equipment) that indicates approval of the transaction. The code may serve as proof of authorization.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the invention include methods for dynamically rendering an interaction graphic on a display of a communication device during an interaction with a user device. The interaction graphic can show a user of the user device where to place the user device so that an NFC antenna in the user device can successfully communicate with an NFC antenna in the communication device.

In embodiments of the invention, the communication device can determine a location of an NFC antenna in the communication device and its location relative to a display in the communication device. The communication device can render an interaction graphic on a user interface on the display, proximate the location of the NFC antenna.

In some cases, the user of the communication device may fold, rotate, and/or otherwise manipulate the communication device. If the communication device is rotated 180 degrees from its current orientation, then the interaction graphic is rendered so that it is located near the new position of the NFC antenna, rather than staying at the same position on the screen regardless of the orientation of the screen or the configuration of the communication device.

The communication device can dynamically render the interaction graphic based on various data obtained by the communication device. For example, the data can include a model of the communication device, a number of screens utilized by the communication device, a current device mode, a display orientation, a display resolution, an applicable scale, and/or other data related to the orientation and/or configuration of the communication device. The communication device can determine the interaction graphic location based on the data, and can render the interaction graphic at that location.

In some embodiments, a server computer, such as a resource provider computer, can perform computations for the communication device remotely. As such, the server computer can determine the location at which to render the interaction graphic. The server computer can then provide the interaction graphic location to the communication device so that the communication device renders the interaction graphic at that location.

FIG. 1 shows a system according to an embodiment. The system 100 includes a user device 110 and a communication device 120.

The user device 110 can comprise a radio frequency (RF) antenna 112 (e.g., an NFC antenna). In some embodiments, the user device 110 can be in the form of a card. In other embodiments, the user device 110 can be in the form of a mobile phone.

The communication device 120 can be a device capable of communicating with other devices (e.g., the user device 110, server computers, resource provider computers, etc.). The communication device 120 can be a desktop computer, a laptop computer, a tablet, a mobile phone, etc.

The communication device 120 can include a base portion 122 and a display apparatus 124 moveably connected to the base portion 122. The base portion 122 can include input device(s) (e.g., a keyboard, a mouse trackpad, etc.).

The display apparatus 124 can display an area 126 which can correspond to the location of a communication device RF antenna inside of the display apparatus 124. The RF antenna 112 and the communication device RF antenna can communicate when the user device 110 is manipulated such that it is proximate to the area 126.

Figure 3:
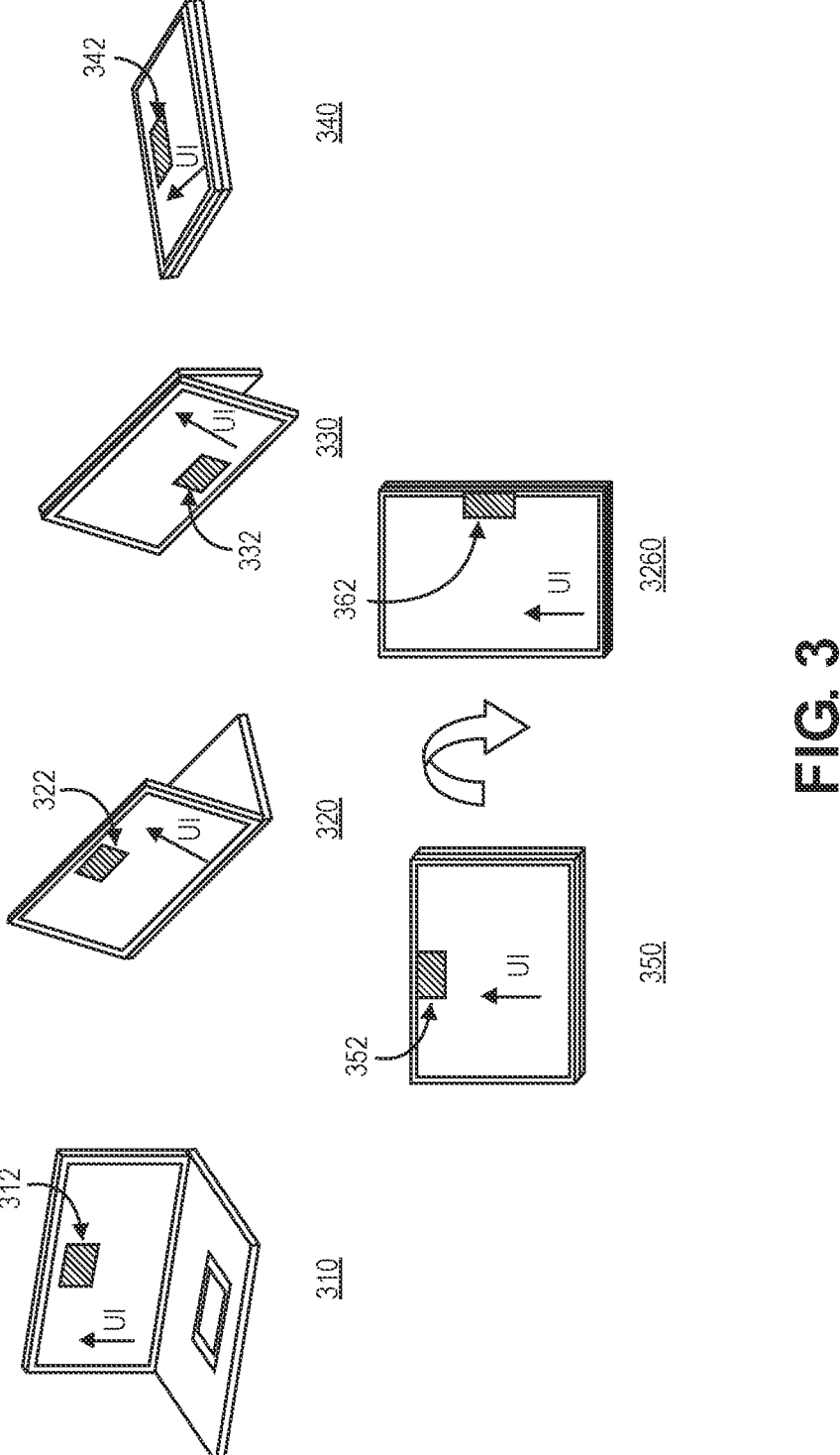
FIG. 3 shows illustrations of communication devices in various orientations and configurations. Interaction graphics on the display screens of the communication devices are shown.

The communication device 120 can be physically configured to be oriented into different device modes, as shown in FIG. 3, which is described in further detail below.

Figure 2:
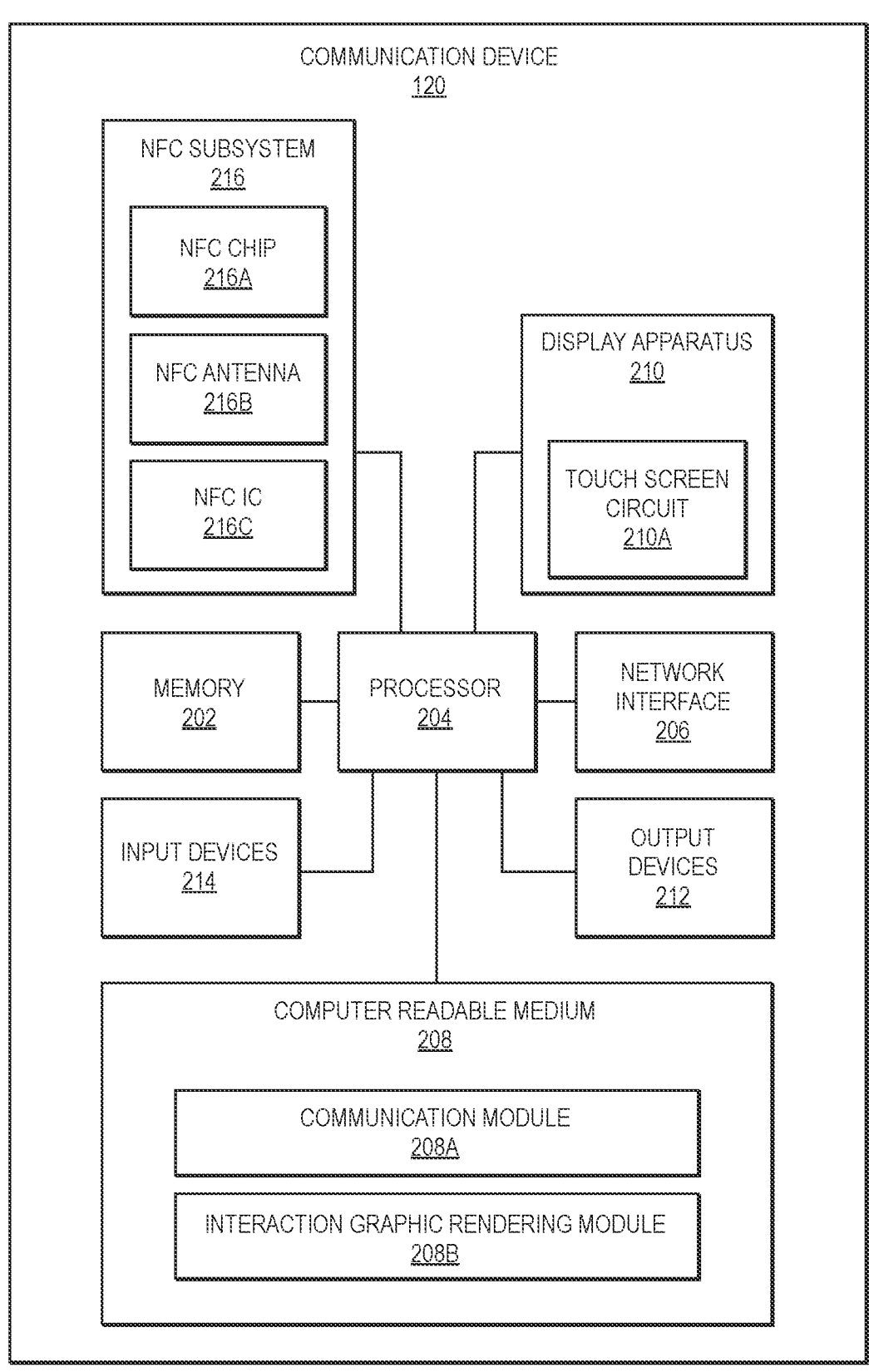
FIG. 2 shows a block diagram of components of a communication device according to embodiments.

FIG. 2 shows a block diagram of a communication device 120 according to embodiments. The exemplary communication device 120 may comprise a processor 204. The processor 204 may be coupled to a memory 202, a network interface 206, a computer readable medium 208, a display apparatus 210, output devices 212, input devices 214, and a near-field communication (NFC) subsystem 216. The computer readable medium 208 can comprise a communication module 208A and an interaction graphic rendering module 208B. The display apparatus 210 can include a touch screen circuit 210A. The NFC subsystem 216 can include an NFC chip 216A, an NFC antenna 216B, and an NFC integrated circuit (IC) 216C.

The memory 202 can be used to store data and code. For example, the memory 202 can store interaction data, cryptographic keys, interaction graphic data, operating system display resolutions, webpage data, device mode data, applicative scale data, etc. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The computer readable medium 208 may comprise code, executable by the processor 204, for performing a method comprising: rendering, by a display of a communication device, a user interface to a user after the user interacts with the communication device; determining, by a processor associated with the communication device, a location of a contactless reader device in the display of the communication device; and responsive to determining the location, rendering an interaction graphic associated with the contactless reader device on the display proximate to the location.

The communication module 208A may comprise code or software, executable by the processor 204, for communicating with other devices. The communication module 208A, in conjunction with the processor 204, can generate messages, forward messages, reformat messages, and/or otherwise communicate with other entities. For example, the communication module 208A can be used to facilitate communications between the communication device 120 and another device, such as a user device, a resource provider computer, or a server computer. The communication module 208A, in conjunction with the processor 204, can communicate with the NFC subsystem 216 to communicate with external devices via NFC communication capabilities.

The interaction graphic rendering module 208B may comprise code or software, executable by the processor 204, for rendering interaction graphics as described herein.

The network interface 206 may include an interface that can allow the communication device 120 to communicate with external computers. The network interface 206 may enable the communication device 120 to communicate data to and from another device (e.g., the user device 110, the resource provider computer 130, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The display apparatus 210 can be a display screen. The display apparatus 210 can include a touch screen circuit 210A. The display apparatus 210 can be a touch screen that is capable of detecting touch inputs. The display apparatus 210 can utilize liquid crystal displays, OLED displays, or other types of displays. Further details regarding LCDs and OLEDs can be found in U.S. Pat. Nos. 9,348,488, 9,046,955, and 11,005,180, which are herein incorporated by reference.

The one or more output devices 212 may comprise any suitable device(s) that may output data. Examples of output devices 212 may include display screens, speakers, data transmission devices, lighted and/or flashing indicators, electromechanical components (e.g., for vibration, motion, etc.), etc.

The one or more input devices 214 may include any suitable device(s) capable of inputting data into the user device 200. Examples of input devices include buttons, touchscreens, touch pads, microphones, switches, knobs, keyboards, speakers, touch-sensitive surfaces, one or more sensors configured to capture images and/or sense proximity, distance, motion, gestures, etc.

The NFC subsystem 216 can include an NFC chip 216A, an NFC antenna 216B, and an NFC IC 216C. The communication module 208A, in conjunction with the processor 204, can cooperate with the NFC subsystem 216 to communicate using NFC.

The communication module 208A allows the processor 204 to control the NFC subsystem 216, which includes the NFC chip 216A, the NFC antenna 216B, and the NFC IC 216C that is tuned typically for 13.56 MHz. The NFC chip 216A could be, for example, a PN531 microcontroller-based transmission module from the Phillips Semiconductor Branch of Koninklijke Phillips Electronics N.V.

The NFC antenna 216B can include an antenna configured to utilize near-field communication frequencies. Near-field communication can include a set of communication protocols that enable communication between two electronic devices over a distance of 4 cm or less. Near-field communication is based on inductive coupling between two antennas present on near-field communication-enabled devices communicating in one or both directions, using a frequency of 13.56 MHz in the globally available unlicensed radio frequency ISM band using the ISO/IEC 14443 air interface standard at data rates ranging from 106 to 848 kbit/s.

The NFC antenna 216B can be connected to an interface and connected to driver circuits. The interface and the driver circuits can connect the near-field communication antenna to the processor 204.

FIG. 3 shows illustrations of various modes and configurations of a communication device 120 that displays interaction graphics 312, 322, 332, 342, 352, 362 associated with a contactless reader device in the communication device 120. For example, the communication device 120 can be a laptop that is capable of folding and rotating orientation. FIG. 3 illustrates six different device modes and orientations of the communication device 120. In the illustrations in FIG. 3, the orientation of a user interface (UI) is shown by an arrow. The user interface could be a Web page or an application page, which is rendered independently or together with the interaction graphics 312, 322, 332, 342, 352, 362. For example, a Web server can render a user interface such as a Web page on the display of the communication device 120, and the interaction graphics 312, 322, 332, 342, 352, 362 can be rendered on top of the Web page. FIG. 3 shows that the positions of the interaction graphics can change, relative the orientation of the user interface.

As the communication device 120 changes a current device mode, configuration, and/or orientation, the communication device 120 can update the user interface that is displaying interaction graphic such that the user interface is readable from the current orientation and the interaction graphic is located on the display screen proximate to the contactless reader device.

As an illustrative example, the communication device 120 can include the contactless reader device at a center top portion of the display screen when the communication device 120 is oriented in a laptop mode 310.

The laptop mode 310 can include the communication device 120 being folded and oriented in such a manner that a keyboard portion of the communication device 120 is flat on a horizontal surface, while the display screen portion of the communication device 120 is perpendicular (or angled) to the keyboard portion, while the keyboard portion is accessible for use. As such, a pivot point located at the intersection of the display screen portion and the keyboard portion can be at an angle of approximately 90 degrees (as measured from 0 degrees being closed). When the communication device 120 is in the laptop mode 310, a first interaction graphic 312 can be rendered at the top middle of the user interface displayed on the display screen, which corresponds to the physical location of the contactless reader device.

A stand mode 320 can include the communication device 120 being folded and oriented in a manner similar to the laptop mode 310, but with the keyboard portion placed such that they keyboard portion is not accessible for use. The pivot point located at the intersection of the display screen portion and the keyboard portion can be at an angle of approximately 270 degrees. When the communication device 120 is in the stand mode 320, a second interaction graphic 322 can be rendered at the top middle of the user interface displayed on the display screen, which corresponds to the physical location of the contactless reader device.

A tent mode 330 can include the communication device 120 being folded and oriented in such a manner that the pivot point located at the intersection of the display portion and the keyboard portion is at the highest point of the communication device 120, with the display portion and the keyboard portion protruding downwards to meet the horizontal surface. The pivot point can be at an angle of approximately 315 degrees. When the communication device 120 is in the tent mode 330, a third interaction graphic 332 can be included at the bottom middle (as seen visually by a user) of the user interface displayed on the display screen, which corresponds to the physical location of the contactless reader device. As shown, the user interface (UI) in the laptop mode 310, the stand mode 320, and the tent mode 300 is in the same orientation relative to the user, even through the interaction graphic may displayed in a different location.

A tablet mode, such as the first tablet mode 340, the second tablet mode 350, and the third tablet mode 360, can include the communication device 120 being folded and oriented in such a manner that the external surface of the display screen (e.g., the back of the screen) is pressed up against the external surface of the keyboard portion (e.g., the back of the keyboard). The pivot point in the tablet mode can be at an angle of approximately 360 degrees. When the communication device 120 is in a first tablet mode 340, a fourth interaction graphic 342 can be rendered at the top middle of the user interface displayed on the display screen, which corresponds to the physical location of the contactless reader device.

When the communication device 120 is in a second tablet mode 350, a fifth interaction graphic 352 can be rendered at the top middle of the user interface displayed on the display screen, which corresponds to the physical location of the contactless reader device.

When the communication device 120 is in a third tablet mode 340, a sixth interaction graphic 362 can be rendered at the right middle of the user interface displayed on the display screen, which corresponds to the physical location of the contactless reader device.

FIG. 4 shows a flow diagram illustrating a dynamically rendered interaction graphic method according to embodiments. The method illustrated in FIG. 4 will be described in the context of the user device 110 performing an interaction with the communication device 120.

In some embodiments, prior to step 402, the communication device 120 can obtain user interface data from a resource provider computer for the interaction between the user device 110 and the communication device 120. The user interface data can include data for a webpage that is to be rendered by a display screen on the communication device 120. For example, the user interface data can include graphical user interface elements (e.g., text, buttons, scroll bars, etc.) for displaying interaction data for the interaction. The user interface data can include instructions for rendering a webpage.

In some embodiments, the method illustrated in FIG. 4 can be triggered by movement detected by the communication device 120 (e.g., detected by a gyroscope, a magnetometer, an accelerometer, etc.). As the communication device 120 moves, the interaction graphic can be dynamically rendered based on the movement of the communication device 120.

At step 402, after the user interacts with the communication device 120, the communication device 120 can render the user interface based on the user interface data on the display screen of the communication device 120.

After displaying the user interface on the display screen, a processor associated with the communication device 120 can perform steps 404-418. In some embodiments, the processor can be a processor included in the communication device 120. In other embodiments, the processor can be included in an external server computer, which can be the resource provider computer or a processing network computer.

In some embodiments, if the processor is a processor in a server computer, then the communication device 120 can generate a display layout request message that requests an interaction graphic location. The communication device 120 can provide the display layout request message to the server computer. In some cases, the display layout request message can include data that aids the server computer in performing any of the steps 404-418 (e.g., communication device model, device mode, device orientation, etc.).

At step 404, the processor can identify the model of the communication device 120. The processor can identify the model using one or more methods of model detection. For example, the processor can identify the model by performing a live detection technique. The live detection technique can include querying system properties stored in the communication device 120 that includes data related to the model. For example, the processor can obtain build data from the system properties. The build data can include version numbers, brand identifiers, model identifiers, manufacturer identifiers, product identifiers, serial numbers, etc. The processor can determine the model of the communication device 120 using a model identifier stored in the communication device 120.

In other embodiments, the communication device 120 may register with the server computer or the resource provider computer prior to performing interactions. The communication device 120 can register (e.g., enroll) with registration data that includes a communication device identifier, a communication device model, a communication device certificate, and/or additional data related to performing interactions and/or dynamically rendering an interaction graphic. The registration data can be stored by the server computer, the resource provider computer, or a database associated therewith. During the interaction, the processor can obtain the model from the stored registration data.

As an illustrative example, if the processor is in the communication device 120 and the communication device 120 is a mobile phone running an Android operating system, then the processor can call the API function of "android.os-.Build.MODEL" to obtain the model.

At step 406, after determining the model, the processor can obtain a physical location (e.g., position data) of a contactless reader device (e.g., an NFC antenna) in the communication device 120 based on the model. For example, the processor can obtain the location of the contactless reader device from a model database using the model. The model database can include a plurality of models with model data for each model. The model data can include the physical location of the contactless reader device for the model.

The physical location can be a relative physical location that is measured relative from a reference location in the communication device 120. For example, the physical location can indicate the position of the contactless reader device as measured relative to the center, top left, middle right, etc. of the communication device 120. The relative physical location can be stored as a three-dimensional vector (e.g., <5 cm, 1 cm, 3 cm>).

Obtaining the physical location of the contactless reader device can aid the processor in determining the location at which to dynamically render the interaction graphic, such that the interaction graphic is on the display screen proximate to the physical location of the contactless reader device.

At step 408, after determining the physical location of the contactless reader device in the communication device 120, the processor can determine a number of screens being utilized by the communication device 120. The processor can detect the existence of multiple screens (built-in or attached). The processor can identify a plurality of display screens utilized by the communication device 120.

The processor can determine one display screen of the plurality of display screens that is closest to the contactless reader device using physical location of the contactless reader device relative to physical locations of the display screens. The processor can select the one display screen as the display screen to display the interaction graphic.

As an example, the processor can select the display screen of the plurality of display screens that includes the contactless reader device, and is therefore closest to the contactless reader device.

Determining which display screen of the plurality of display screens is most proximate to the contactless reader device can aid the processor in determining the location at which to dynamically render the interaction graphic, such that the interaction graphic is rendered on the correct display screen.

At step 410, the processor can detect a device mode of the communication device 120. The communication device can be in one device mode of a plurality of device modes (e.g., a laptop mode, a stand mode, a tent mode, a tablet mode, a lid closed mode, etc.). At step 412, the processor can detect an orientation of the selected display screen.

The processor can obtain the device mode and/or the orientation of the communication device 120 from the communication device 120. The processor can obtain the orientation of the communication device 120 using an API call such as "GetRotation( )." Similar, the processor can obtain the current device mode using an API call such as "GetDeviceMode( )."

In some embodiments, the processor can obtain an angle that indicates the pivot point angle between the screen portion and the keyboard portion of the communication device 120. The processor can then determine the device mode based on the angle. For example, an angle of approximately 90 degrees can indicate that the current device mode is a laptop mode.

In some embodiments, the processor can determine the orientation of the communication device 120 using one or more detectors in the communication device 120, including, but not limited to, a gyroscope, a magnetometer, and/or an accelerometer. The one or more detectors can indicate which portion of the communication device 120 is pointed upwards in space.

As an illustrative example, the processor can obtain the pivot point angle from the communication device 120, which can be a value of approximately 360 degrees. A pivot point angle of approximately 360 degrees can indicate that the communication device 120 is in a tablet mode. The processor can then obtain the rotation of the communication device 120 to determine which side of the communication device 120 is oriented upwards in space while in tablet mode. The rotation of the communication device 120 can also be utilized to determine if the display screen is in landscape mode or in portrait mode.

Determining the device mode and the orientation can aid the processor in determining which portion of the display screen is viewed as the top of the display screen by the user. By determining which portion of the display screen is the top, the processor can render the interaction graphic in a correct orientation such that the interaction graphic is readable to the user (e.g., it is not upside down or sideways).

At step 414, after detecting the device mode and orientation, the processor can detect a display resolution of the selected display screen. The processor can obtain the display resolution from display resolution data stored in the communication device 120. The processor can obtain the display resolution from the operating system in the communication device 120. The processor can also obtain data related to the display resolution (e.g., dots per linear inch (dpi), scale settings, etc.).

Detecting the display resolution can aid the processor in determining how large to scale the interaction graphic and the user interface relative to the size of the display and how many pixels can be shown on the display. For example, if the display has a high resolution, then the interaction graphic needs to cover more pixels to be the same physically rendered size than if the display had a low resolution. The processor can scale the interaction graphic relative to the resolution such that the interaction graphic retains is size relative to the location of the screen proximate to the contactless reader device.

At step 416, after detecting the display resolution, the processor can detect an applicative scale. The applicative scale can be the scale of an application that is rendering the user interface. For example, the application can be an Internet browser application. The applicative scale can be the browser zoom amount.

The processor can obtain the applicative scale from the application that is rendering the user interface. The processor can obtain, for example, the browser zoom amount from the Internet browser application.

Detecting the applicative scale can aid the processor in determining how large to scale the interaction graphic in the user interface displayed in the Internet browser application relative to the other elements displayed in the user interface based on the applicative scale. For example, if the browser zoom is large (e.g., zoomed in), then the user interface elements will appear larger than their standard size. However, if the interaction graphic is also scaled by the browser zoom, then the interaction graphic will be too large compared to the location at which the contactless reader device is located. The processor can scale down the interaction graphic relative to the applicative zoom such that the interaction graphic retains is size relative to the location of the screen proximate to the contactless reader device.

At step 418, after detecting the applicative scale, the processor can determine an interaction graphic position for the interaction graphic based on the physical location of the contactless reader device, the selected display screen, the device mode, the display screen orientation, the display resolution, and/or the applicative scale.

The processor can determine the location of the display screen at which to render the interaction graphic using the aforementioned steps. The processor can render the interaction graphic in the user interface proximate to the physical location of the contactless reader device in the communication device 120.

As an illustration, the processor can identify the communication device 120 laptop model as a first model that includes a contactless reader device that is located in an upper right corner of the display screen under the screen. The processor can determine that the communication device 120 has two screens, and that the contactless reader device is located in the upper right corner of the second screen. The processor can determine that the communication device 120 is in a tent mode, where the typical upward portion of the display screen is on the bottom of the display screen as viewed by the user. Based on the orientation, the processor can determine that the contactless reader device is located in the bottom left corner of the second screen in its current orientation as viewed by the user. The processor can then determine a scale at which to render the interaction graphic in the bottom left corner of the display screen based on the display resolution and the applicative scale of the application that is displaying the user interface. In such an example, the processor can determine to scale the interaction graphic by 1.5 times a base size of the interaction graphic. As such, the processor can determine the location of the interaction graphic as being the bottom left corner of the second screen with a scale size of 1.5.

In some embodiments, if the processor is a processor in the server computer, the server computer can generate a display layout response message comprising the interaction graphic position in response to the display layout request message. The server computer can provide the display layout response message to the communication device 120.

At step 420, after determining the interaction graphic position, the communication device 120 can render the interaction graphic associated with the contactless reader device on the display screen of the communication device 120.

For example, the processor can render the aforementioned interaction graphic in the bottom left corner of the display screen at a scale size of 1.5 such that the interaction graphic is located proximate to the contactless reader device. A user can then be able to identify the location at which they are to position their user device 110 to enable NFC communication between the user device 110 and the contactless reader device in the communication device 120.

In some embodiments, the processor can be included in the server computer. The server computer can first identify the model of the communication device. For example, a user may be logging into a resource provider website. During this login, the resource provider website or another server computer can detect the communication device and can determine the model of the communication device.

The server computer can retrieve the physical location of the NFC antenna of the device of the device model from a database. The database can include information of particular manufacturers and models of communication devices. For example, the database can include information (e.g., quantitative values for the location) that communication devices made by company X have the NFC antenna near the bottom right hand corner of the display screen when the display screen is in a landscape orientation.

The server computer can then detect the existence of multiple screens (e.g., built-in or attached). For example, the Internet browser application user interface may be displayed on an external monitor, but not on a laptop monitor. If the user interface is on the external monitor and not the laptop monitor and the laptop has the device reader, then the user may be instructed accordingly. The server computer can detect the device mode (e.g., a laptop mode, a stand mode, a tent mode, a tablet mode or a closed mode). The server computer can detect the device screen orientation (e.g., landscape or portrait). The server computer can then detect the OS display resolution (e.g., dpi and scale settings). The server computer can then detect the applicative scale (e.g., browser zoom) needed to render the interaction graphic. Using the data collected in the above steps, the server computer can instruct the communication device 120 on how to dynamically render the interaction graphic (e.g., tapping guidance) on the screen of the communication device.

Figure 5:
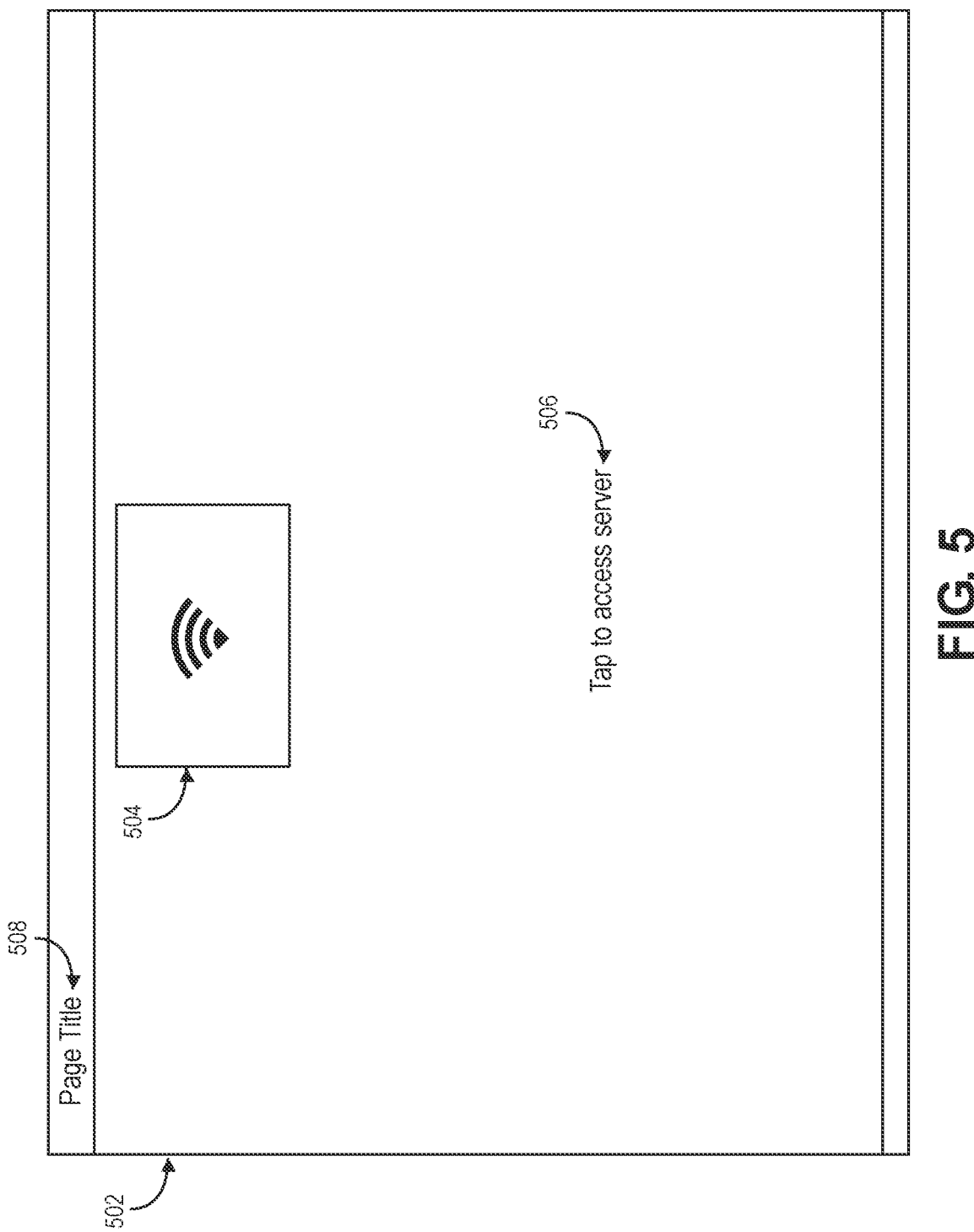
FIG. 5 shows a diagram illustrating a user interface for a communication device in a stand mode according to embodiments.

FIG. 5 shows a diagram illustrating a user interface 502 for the communication device 120 in a stand mode according to embodiments. The user interface 502 includes an interaction graphic 504, instructions 506, and a page title 508. In this example, while in a stand mode, a contactless reader device in the communication device 120 can be located near the top middle of the display screen as viewed by a user.

The interaction graphic 504 can be a dynamically rendered user interface element that is rendered at a location of the display screen that is proximate to the contactless reader device (e.g., an NFC antenna) in the communication device 120. The interaction graphic 504 can be an NFC antenna graphic that can indicate to a user an area where the user should interact their user device. The interaction graphic 504 can be rendered at the top middle portion of the display screen of the communication device 120 in a stand mode.

The instructions 506 can be instructions to the user that indicate for the user to tap their user device (e.g., bring the user device into position near the interaction graphic) to perform an interaction (e.g., to access a server). The instructions can be rendered to the bottom and middle portions of the display screen as to not overlap with the interaction graphic 504.

The page title 508 can be a title of the displayed user interface 502. The page title 508 can display the text of, for example, "Server Access Request" or other suitable text. In some embodiments, the user interface 502 can display additional information (e.g., the interaction data, the time, a cancel button, etc.).

Figure 6:
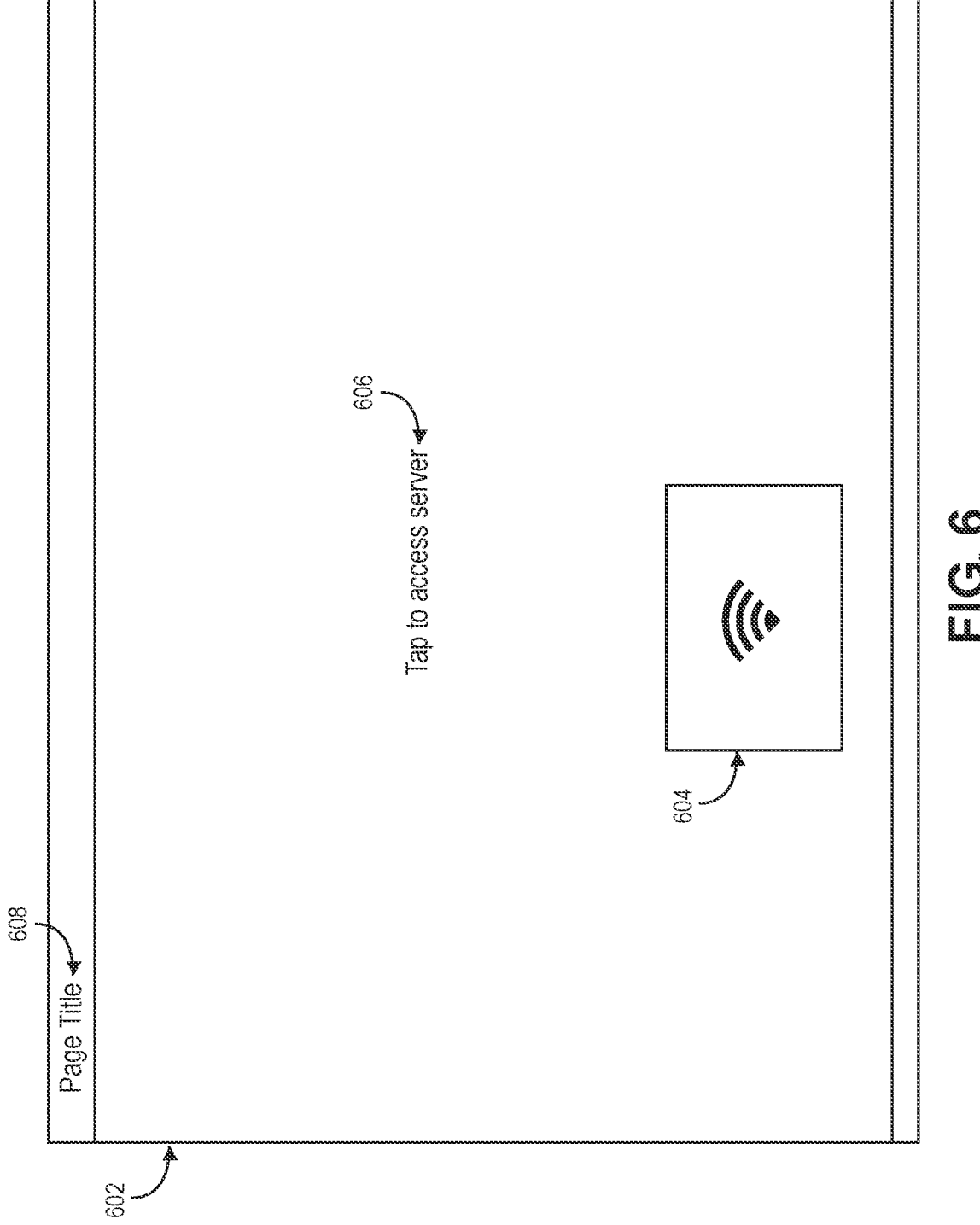
FIG. 6 shows a diagram illustrating a user interface for a communication device in a tent mode according to embodiments.

FIG. 6 shows a diagram illustrating a user interface 602 for a communication device 120 in a tent mode according to embodiments. The user interface 602 includes an interaction graphic 604, instructions 606, and a page title 608. In this example, while in a tent mode, a contactless reader device in the communication device 120 can be located near the bottom middle of the display screen as viewed by a user. The display screen may be physically rotated upside down as compared to the display screen in stand mode.

The interaction graphic 604 can be a dynamically rendered user interface element that is rendered at a location of the display screen that is proximate to the contactless reader device in the communication device 120. Since the contactless reader device is at the bottom middle portion of the communication device 120 as viewed by a user, the interaction graphic 604 can be rendered at the bottom middle portion of the display screen, while in tent mode.

The instructions 606 can be instructions to the user that indicate for the user to tap their user device. The instructions can be rendered in the top or middle portions of the display screen as to not overlap with the interaction graphic 604. The page title 608 can be a title of the displayed user interface 602.

Figure 7:
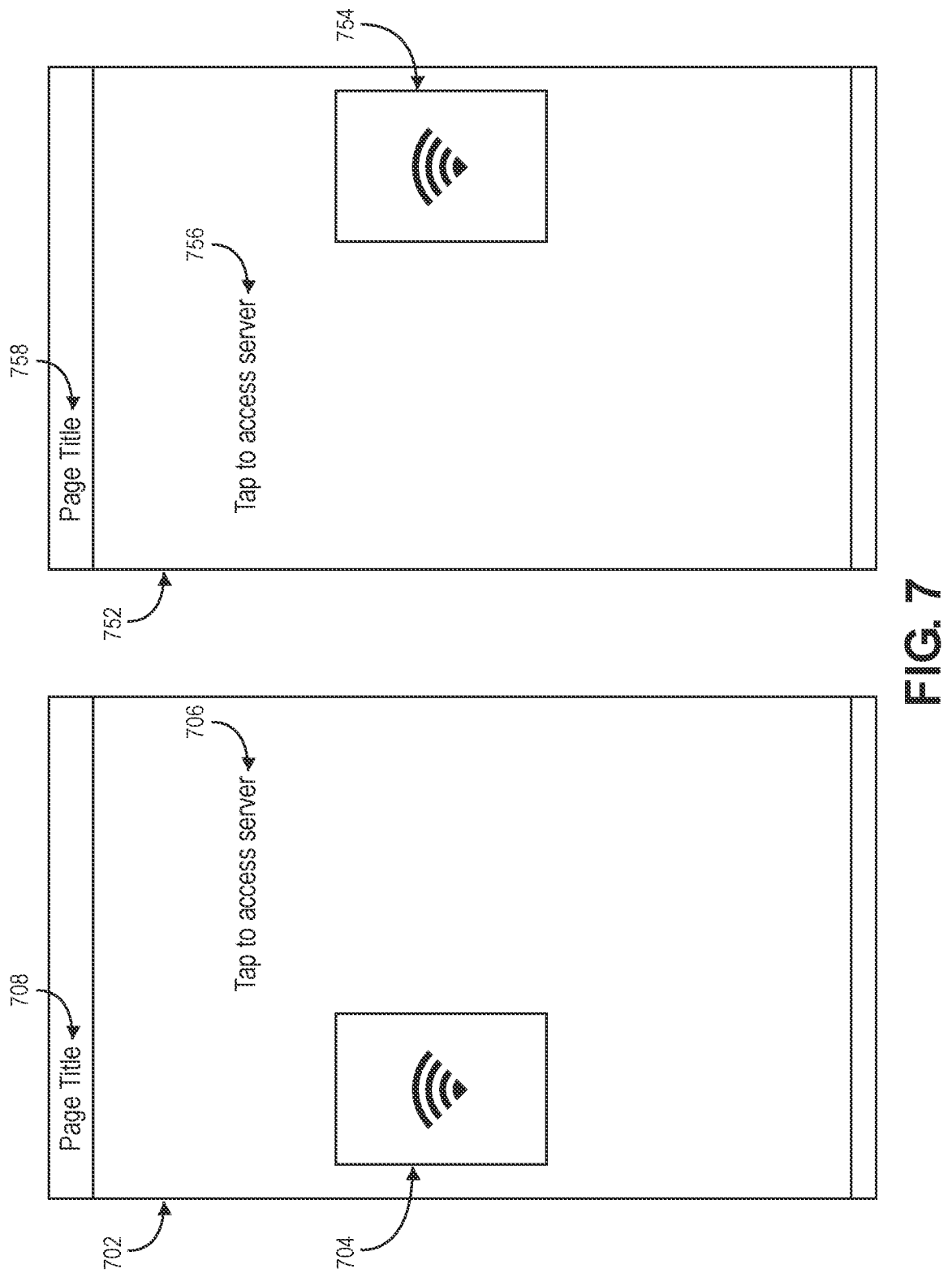
FIG. 7 shows a diagram illustrating user interfaces for a communication device in a tablet mode according to embodiments.

FIG. 7 shows a diagram illustrating user interfaces for a communication device in a tablet mode according to embodiments. FIG. 7 illustrates a first user interface 702 and a second user interface 752. The first user interface 702 includes a first interaction graphic 704, first instructions 706, and a first page title 708. The second user interface 752 includes a second interaction graphic 754, second instructions 756, and a second page title 758. The first user interface 702 and the second user interface 752 illustrate two orientations of the communication device 120 when the communication device 120 is in a tablet mode. The first user interface 702 can be displayed at a first orientation. The second user interface 752 can be displayed at a second orientation.

When in tablet mode, the display portion of the communication device 120 can be oriented at any angle. The orientation of the communication device 120 can be used to aid in the determination of the location at which to dynamically render the first interaction graphic 704. The orientation of the communication device 120 for the first user interface 702 can place the contactless reader device at the middle left portion of the communication device 120 as viewed by a user. Since the contactless reader device is at the middle left portion of the display screen, the interaction graphic 704 can be rendered at the middle left portion of the display screen.

The instructions 706 can be instructions to the user that indicate for the user to tap their user device. The instructions can be rendered to the right portion of the display screen as to not overlap with the interaction graphic 704. The page title 708 can be a title of the displayed user interface 702.

The second user interface 752 can be displayed when the communication device 120 is rotated by 180 degrees relative to the orientation of the communication device when the first user interface 702 is shown. In such a situation, the communication device 120 is still in tablet mode and still in a portrait orientation (as opposed to landscape orientation), however, the contactless reader device is now located at the middle right portion of the communication device 120 as viewed by a user. Since the contactless reader device is at the middle right portion of the display screen, the interaction graphic 754 can be rendered at the middle right portion of the display screen.

The instructions 756 can be rendered to the left portion of the display screen as to not overlap with the interaction graphic 754. The page title 758 can remain rendered at a top portion of the display screen as viewed by a user.

Figure 8:
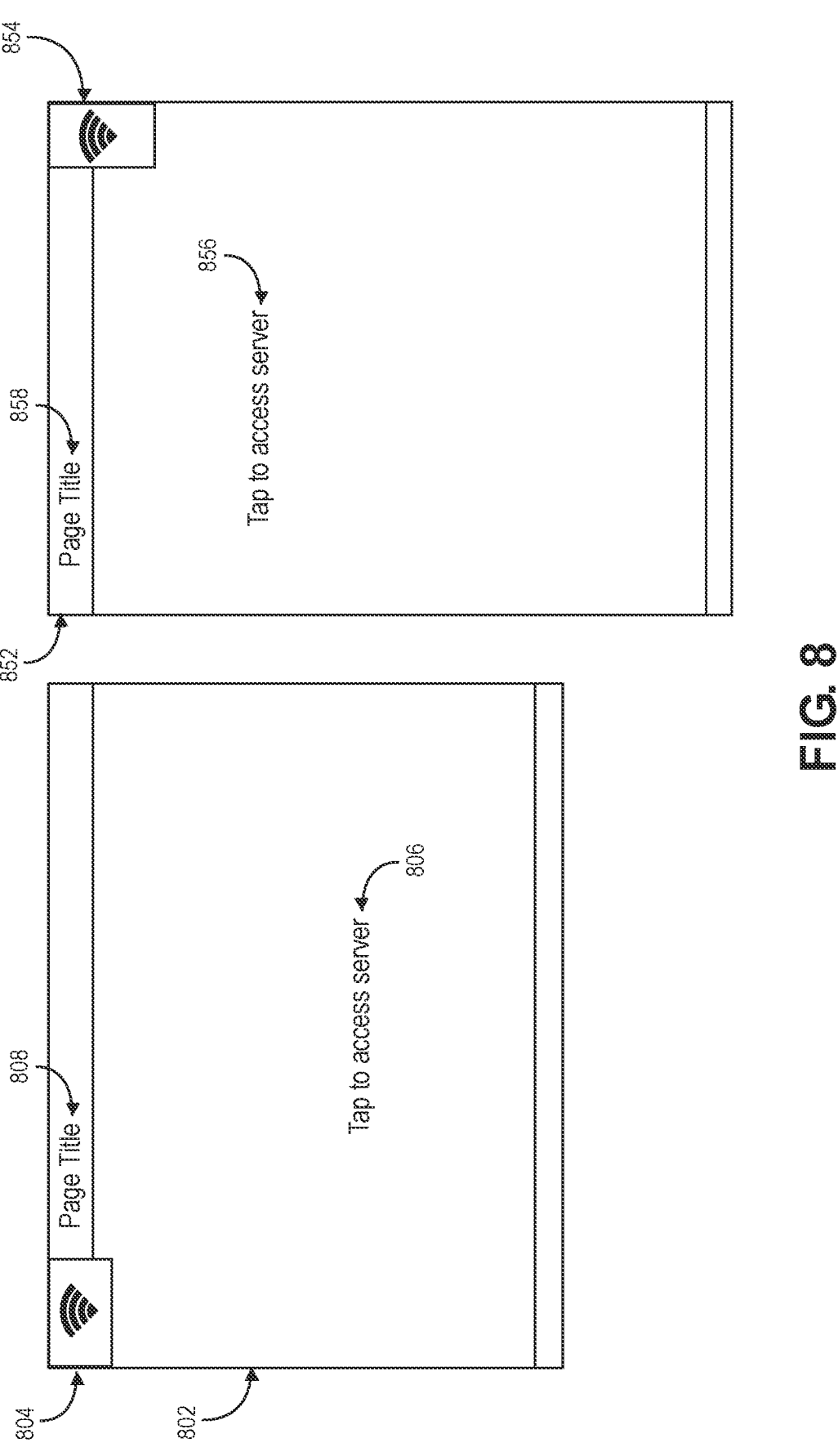
FIG. 8 shows a diagram illustrating user interfaces for a communication device with a corner located contactless reader device according to embodiments.

FIG. 8 shows a diagram illustrating user interfaces for a communication device with a corner located contactless reader device according to embodiments. FIG. 8 illustrates a first user interface 802 and a second user interface 852. The first user interface 802 includes a first interaction graphic 804, first instructions 806, and a first page title 808. The second user interface 852 includes a second interaction graphic 854, second instructions 856, and a second page title 858. The first user interface 802 and the second user interface 852 illustrate two orientations of the communication device 820 when the communication device 120 is in a tablet mode. In this example, the contactless reader device can be physically located in a corner of the communication device 120. The first user interface 702 can be displayed at a first orientation. The second user interface 752 can be displayed at a second orientation.

When in tablet mode, the display portion of the communication device 120 can be oriented at any angle. The orientation of the communication device 120 can be used to aid in the determination of the location at which to dynamically render the first interaction graphic 804. The orientation of the communication device 120 for the first user interface 802 can be in a landscape orientation and can place the contactless reader device at the top left corner of the communication device 120 as viewed by a user. Since the contactless reader device is at the top left corner of the display screen, the interaction graphic 804 can be rendered at the top left corner of the display screen.

The instructions 806 can be rendered to the center portion of the display screen as to not overlap with the interaction graphic 804.

The page title 808 can be a title of the displayed user interface 802. The page title 808 may typically be located at the upper right corner of the first user interface 802. However, since the interaction graphic 804 is being rendered to the upper right corner of the first user interface 802, the page title 808 can be offset from the upper right corner based on the size and scaling of the interaction graphic 804.

The second user interface 852 can be displayed when the communication device 120 is rotated by 90 degrees in a clockwise direction. In such a situation, the communication device 120 is still in tablet mode, but changes from a landscape orientation to a portrait orientation. The contactless reader device is now located at the top right corner of the communication device 120 as viewed by a user. Since the contactless reader device is at the top right corner of the communication device 120, the interaction graphic 854 can be rendered at the top right corner of the display screen.

The instructions 856 can be rendered to the left or center portions of the display screen as to not overlap with the interaction graphic 854. The page title 858 can be rendered at a top left portion of the display screen as viewed by a user.

Figure 9:
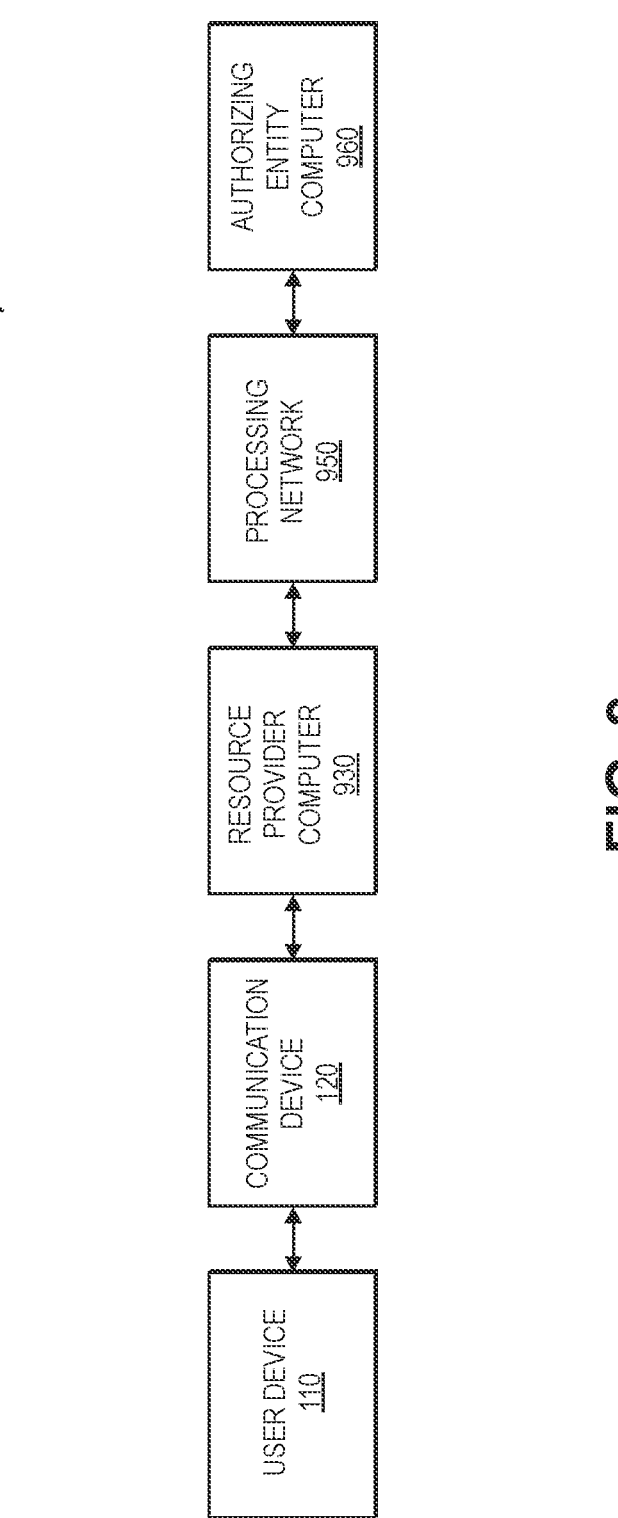
FIG. 9 shows a block diagram of an interaction system according to embodiments.

FIG. 9 shows a system 900 according to embodiments of the disclosure. The system 900 comprises a user 906, a user device 110, a communication device 120, a resource provider computer 930, a processing network 950, and an authorizing entity computer 960. The user device 110 is in operative communication with the communication device 120. The communication device is in operative communication with the resource provider computer 930, which is in operative communication with the processing network 950. The processing network 950 is in operative communication with the authorizing entity computer 960.

For simplicity of illustration, a certain number of components are shown in FIG. 9. It is understood, however, that embodiments of the invention may include more than one of each component. In addition, some embodiments of the invention may include fewer than or greater than all of the components shown in FIG. 9.

Messages between the devices included in the system 900 illustrated in FIG. 9 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The system 900 can be a transaction processing system that can use a mobile device with interaction data. FIG. 9 shows a user device 110 (e.g., a payment card) and a communication device 120 (e.g., a laptop computer), interacting with a resource provider computer 930. The resource provider computer 930 may communicate with the authorizing entity computer 960 via a transport computer and the processing network 950.

The user device 110 can be placed proximate to a landing area in a display apparatus of the communication device 120 as described above. A credential can be read from user device 110 via a second RF antenna therein and a first RF antenna in in the display apparatus in the communication device 120. A processor in the communication device 720 can receive the credential and can transmit it to the resource provider computer 930. The resource provider computer 930 can generate and transmit an authorization request message including a transaction amount to the authorizing entity computer 960 via a transport computer (not shown) and the processing network 950 for authorization. The authorizing entity computer 960 can respond to the resource provider computer 930 with an authorization response message approving or declining the transaction. The resource provider computer 930 can provide the communication device 120 with an indication of whether or not the authorization request was approved. Later, a clearing and settlement process can occur between the transport computer, the processing network 950 and the authorizing entity computer 960.

Embodiments of the disclosure have a number of technical advantages. For example, embodiments can provide guidance to a user when the user wants to interact their user device with a communication device in an interaction to access a resource, regardless of the type of communication device used by the user and its current configuration and/or orientation. The user is not confused as to where they should place their user device relative to their communication device, thus leading to more efficient user interactions.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
rendering, by a display of a communication device, the communication device being a laptop computer comprising an Internet browser, a user interface to a user after the user interacts with the communication device;
determining, by a processor associated with the communication device, a physical location of a contactless reader device in the display of the communication device;
detecting a first orientation of the communication device;
detecting a first applicable scale in the Internet browser for a first interaction graphic;
rendering the first interaction graphic in the Internet browser on the display proximate to the physical location of the contactless reader device using the first orientation and the first applicable scale;
detecting a second orientation of the communication device;
detecting a second applicable scale in the Internet browser for a second interaction graphic; and
rendering the second interaction graphic on the display proximate to the physical location of the contactless reader device in the Internet browser using the second orientation and the second applicable scale.

2. The method of claim 1, wherein the processor is on an external server computer.

3. The method of claim 2, further comprising:
generating, by the communication device, a display layout request message;
providing, by the communication device, the display layout request message to the external server computer; and
receiving, by the communication device, a display layout response message comprising the physical location and/or an interaction graphic location that is on the display proximate to the physical location.

4. The method of claim 1, wherein the processor is on the communication device.

5. The method of claim 1, further comprising:
detecting a display resolution of the display,
wherein the rendering of the second interaction graphic is also based on the display resolution.

6. The method of claim 1, further comprising:
obtaining, by the communication device, user interface data from a resource provider computer, wherein rendering the user interface is based on the user interface data.

7. The method of claim 1, wherein the display is a first display of a plurality of displays, wherein the method further comprises:
determining one display of the plurality of displays that is closest to the contactless reader device, wherein the one display is the first display.

8. The method of claim 1, further comprising:
identifying a model of the communication device, wherein determining the physical location of the contactless reader device in the display of the communication device comprises:
determining the physical location of the contactless reader device using the model and a model database.

9. The method of claim 1, further comprising:
detecting a device mode of the communication device, wherein rendering the first interaction graphic is based on the device mode.

10. The method of claim 1, wherein the first and the second interaction graphics are dynamically rendered based on movement of the communication device.

11. The method of claim 1, wherein after rendering the second interaction graphic associated with the contactless reader device on the display proximate to the physical location, the method further comprises:
establishing communication between the contactless reader device and a user device that is brought into communication range of the contactless reader device by the user.

12. A communication device in the form of a laptop computer comprising:
a processor; and
a computer-readable medium coupled to the processor, the computer-readable medium comprising an Internet browser and code executable by the processor for implementing a method comprising:
rendering, in a display, a user interface to a user after the user interacts with the communication device;
determining a physical location of a contactless reader device in the display of the communication device;
detecting a first orientation of the communication device;
detecting a first applicable scale in the Internet browser for a first interaction graphic;
rendering the first interaction graphic in the Internet browser on the display proximate to the physical location of the contactless reader device using the first orientation and the first applicable scale;
detecting a second orientation of the communication device;
detecting a second applicable scale in the Internet browser for a second interaction graphic; and
rendering the second interaction graphic proximate to the physical location of the contactless reader device in the Internet browser using the second orientation and the second applicable scale.

13. The communication device of claim 12, wherein the display is a first display of a plurality of displays, wherein the method further comprises:
determining one display of the plurality of displays that is closest to the contactless reader device, wherein the one display is the first display; and
detecting a display resolution,
wherein the rendering of the first interaction graphic on the one display is based on the display resolution, the one display being the first display.

14. The communication device of claim 12, further comprising:
the contactless reader device, wherein the contactless reader device is a near-field communication antenna coupled to a near-field communication chip in a near-field communication subsystem, wherein the near-field communication subsystem is coupled to the processor.

15. The communication device of claim 12, further comprising:
the display.

16. The communication device of claim 12, wherein the method further comprises:
detecting a device mode of the communication device, wherein rendering the first interaction graphic is also based on the device mode; and identifying a model of the communication device, wherein determining the physical location of the contactless reader device in the display of the communication device comprises:

determining the physical location of the contactless reader device using the model and a model database.

17. The communication device of claim 12, wherein the first interaction graphic is dynamically rendered based on movement of the communication device.

18. A system comprising:

a laptop computer comprising, a processor, and a computer-readable medium coupled to the processor, the computer-readable medium comprising an Internet browser and code executable by the processor for implementing a method comprising, rendering, in a display, a user interface to a user after the user interacts with a communication device, determining a physical location of a contactless reader device in the display of the communication device, detecting a first orientation of the communication device;

detecting a first applicable scale in the Internet browser for a first interaction graphic;

rendering the first interaction graphic in the Internet browser on the display proximate to the physical location of the contactless reader device using the first orientation and the first applicable scale;

detecting a second orientation of the communication device;

detecting a second applicable scale in the Internet browser for a second interaction graphic; and rendering the second interaction graphic on the display proximate to the physical location of the contactless reader device in the Internet browser using the second orientation and the second applicable scale.

19. The system of claim 18, further comprising a server computer in communication with the laptop computer.

20. The system of claim 18, further comprising a server computer and a user device, wherein the computer-readable medium and the processor are included in the server computer.

* * * * *